United States Patent [19]
Carico

[11] Patent Number: 5,895,086
[45] Date of Patent: Apr. 20, 1999

[54] LAND VEHICLE STORAGE COMPARTMENT AND METHOD

[76] Inventor: David F. Carico, P.O. Box 300, Wallburg, N.C. 27373

[21] Appl. No.: 08/888,634

[22] Filed: Jul. 7, 1997

[51] Int. Cl.[6] ........................................ B60R 7/04
[52] U.S. Cl. .............................. 296/37.6; 296/37.15
[58] Field of Search ..................... 296/37.6, 37.15

[56] References Cited

U.S. PATENT DOCUMENTS

| | | | |
|---|---|---|---|
| 4,738,480 | 4/1988 | Ward | 296/37.6 |
| 4,917,430 | 4/1990 | Lawrence | 296/37.6 |
| 5,615,922 | 4/1997 | Blanchard | 296/37.6 |

FOREIGN PATENT DOCUMENTS 768133  7/1934  France ..................... 296/37.15

*Primary Examiner*—Gary C. Hoge

[57] ABSTRACT

A motor vehicle having a passenger compartment has an exterior door giving access to a storage compartment disposed under the backseat. The storage compartment extends substantially the width of the vehicle. Within the storage compartment, a drawer is mounted. The drawer extends in a direction transverse to the longitudinal axis of the motor vehicle substantially the length of the storage compartment.

17 Claims, 6 Drawing Sheets

5,895,086

1
LAND VEHICLE STORAGE COMPARTMENT AND METHOD

BACKGROUND OF THE INVENTION

1. Field of the Invention

The invention herein pertains to a land vehicle storage compartment located under the second or back seat of a land vehicle, and to a door of comparable size located in such a manner to give access to said storage compartment from the outside. A sliding drawer is disposed within.

2. Description Of The Prior Art And Objectives Of The Invention

Pickup trucks have recently seen an explosion in the popularity of extended cabs which have a second seat disposed behind the driver's seat in the passenger compartment or cab. Typically, these extended cabs have a bench seat for other passengers or cargo, located the width of the cab. Such extended cabs may have a third door, or more commonly, the front seats tilt forward to allow access to the back seat.

Utility trucks as used by power and phone companies have frequently had access panels allowing access to storage compartments disposed in the bed and along the sides of the bed of such a truck, but typically such storage compartments have little depth and are not found in the passenger compartment of the truck.

A number of factors must be considered in the design of a truck and specifically the cab. One factor which has received considerable attention in the last several decades is minimization of wind resistance. A substantial percentage of the cost of fuel is spent in overcoming the frictional forces due to wind resistance which act to oppose the motion of the cab. In order to streamline the vehicle, the exterior body of the cab is provided with a smooth, streamlined design. As can be appreciated storage compartments located on utility trucks are not particularly streamlined and result in higher fuel consumption.

The height of a cab is also important. It is desirable to reduce the height of the cab in order to lower wind resistance. It also is desirable to lower the height of the operator seat in order to reduce the height which the driver must ascend in order to operate the vehicle.

While the practice of truck drivers to slip a lunch box or the like under the seat is well known, it is also well known that storage of loose objects in the cab creates the hazard of projectiles in the case of sudden stops or accidents.

Thus, with the problems associated with prior art storage compartments and a need to minimize wind resistance, the present invention was conceived and it is an object herein to provide an improved storage compartment under the second or back seat of a pickup truck.

It is a further object of the invention to provide a storage space which is partitioned from the passenger driving compartment in order to avoid the hazard of projectiles to the operator or passengers.

It is another object of the invention to provide a storage compartment for tools or the like which is included within the cab portion of a truck.

Another object of the invention is to provide a storage compartment which is readily accessible to the operator of the vehicle.

Yet another object of the invention is to provide a storage compartment without disadvantageously increasing the height of the cab.

2

Still another object of the invention is to provide a convenient sliding compartment for tool storage in the cab.

Still further objects and advantages of the invention will become readily apparent to those skilled in the art to which the invention pertains upon reference to the following detailed description.

SUMMARY OF THE INVENTION

This invention herein provides a vehicle storage compartment within the cab wherein the compartment contains a sliding drawer for storage of tools or other items and wherein the compartment is located under a second or back seat of a truck. The storage compartment is accessed through the exterior body of the vehicle while maintaining a smooth body profile to keep wind resistance at a minimum.

DETAILED DESCRIPTION OF THE PREFERRED EMBODIMENT AND OPERATION OF THE INVENTION

Figure 1:
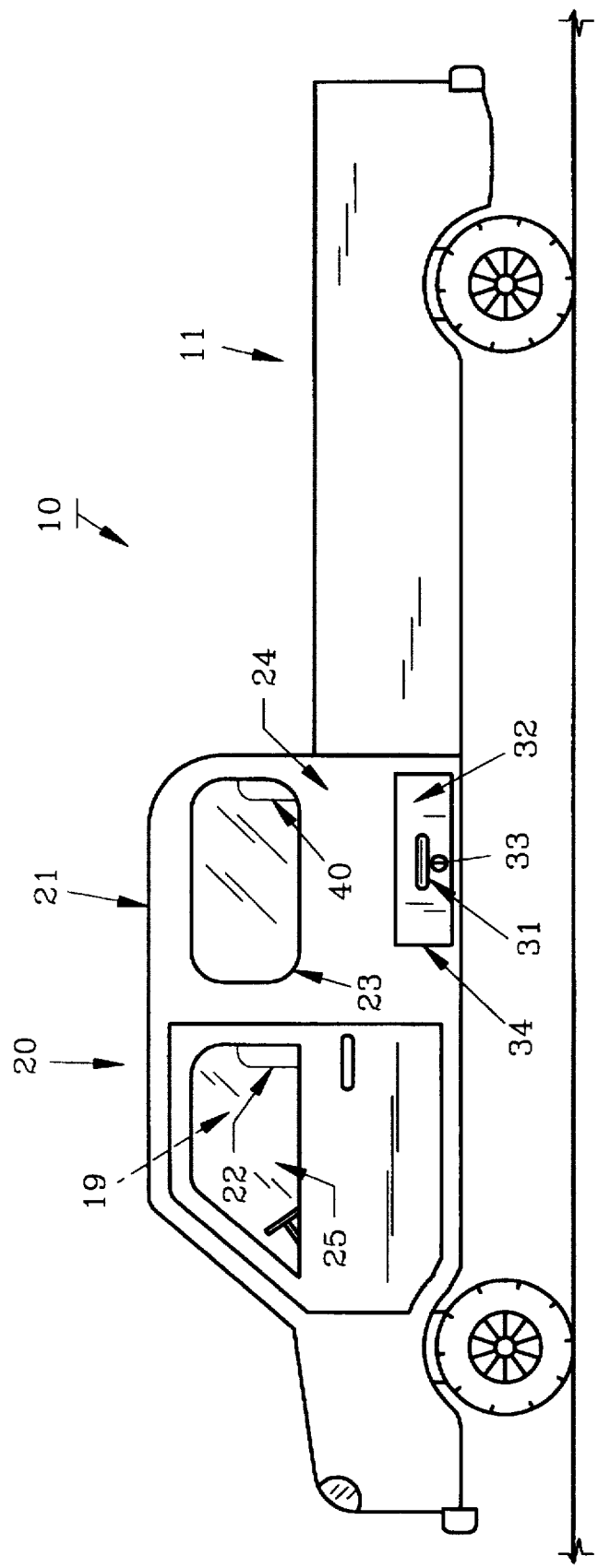
FIG. 1 shows a side view of a motor vehicle with the storage compartment door in its closed position.

Turning now to the drawings, FIG. 1 shows a side view of pickup truck 10 including bed 11 and cab 20 with extended cab portion 21. Inside cab 20 is passenger compartment 19. Within passenger compartment 19 and through window 25 can be seen operator seat 22 and through window 23 can be seen second or back seat (hereinafter second seat) 40 behind operator seat 22. Cab 20 has exterior body wall 24 preferably made out of sheet metal. Opening 34 contains storage compartment door 32 when storage compartment door 32 is closed as pictured in FIG. 1. Storage compartment door 32 has handle 31 preferably flushly adapted with the surface of exterior body wall 24 and includes conventional vehicle door lock 33 adapted to receive ignition key (not shown) of truck 10.

Figure 2:
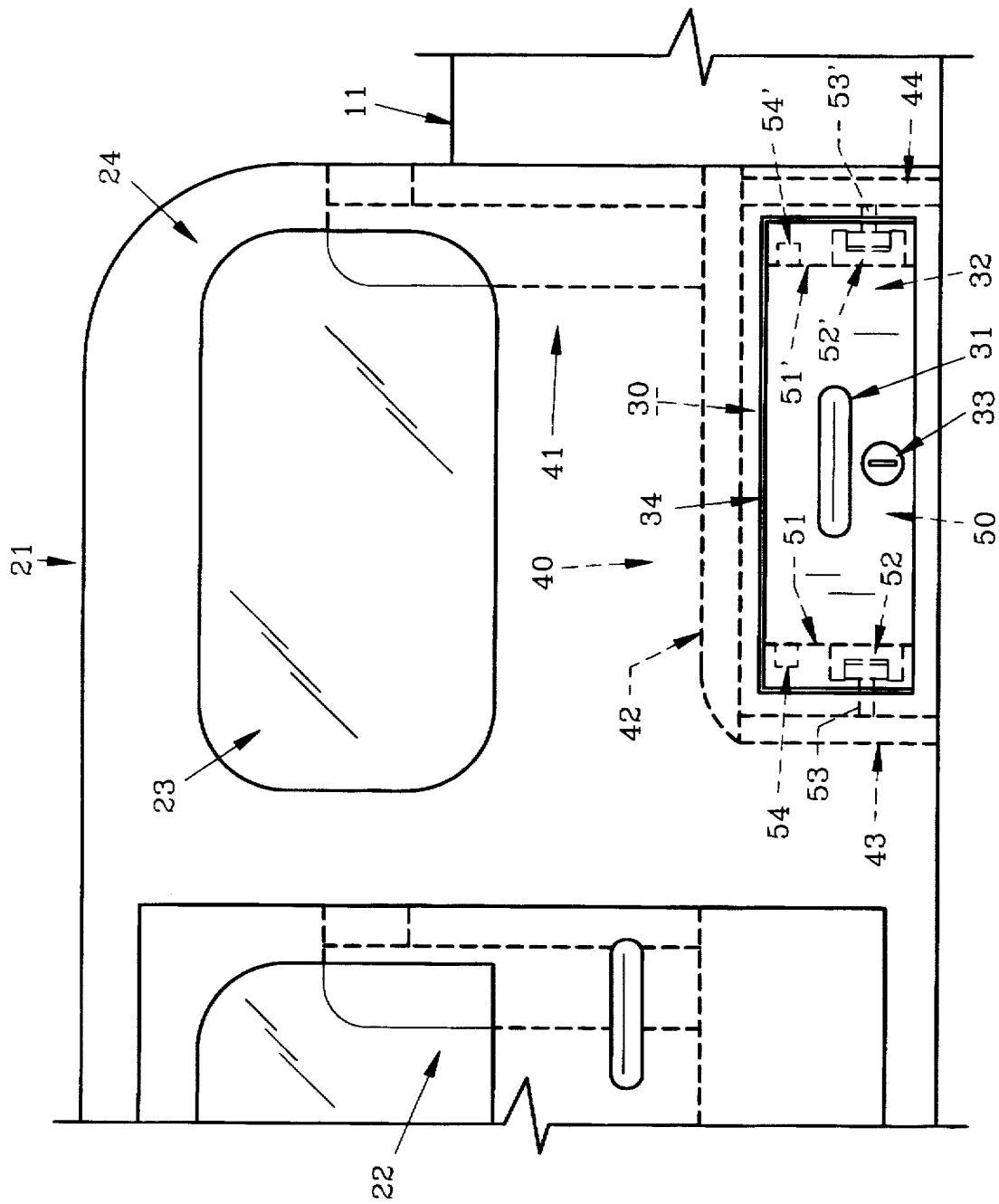
FIG. 2 depicts an enlarged partial side view of the vehicle showing the storage compartment door.
Figure 3:
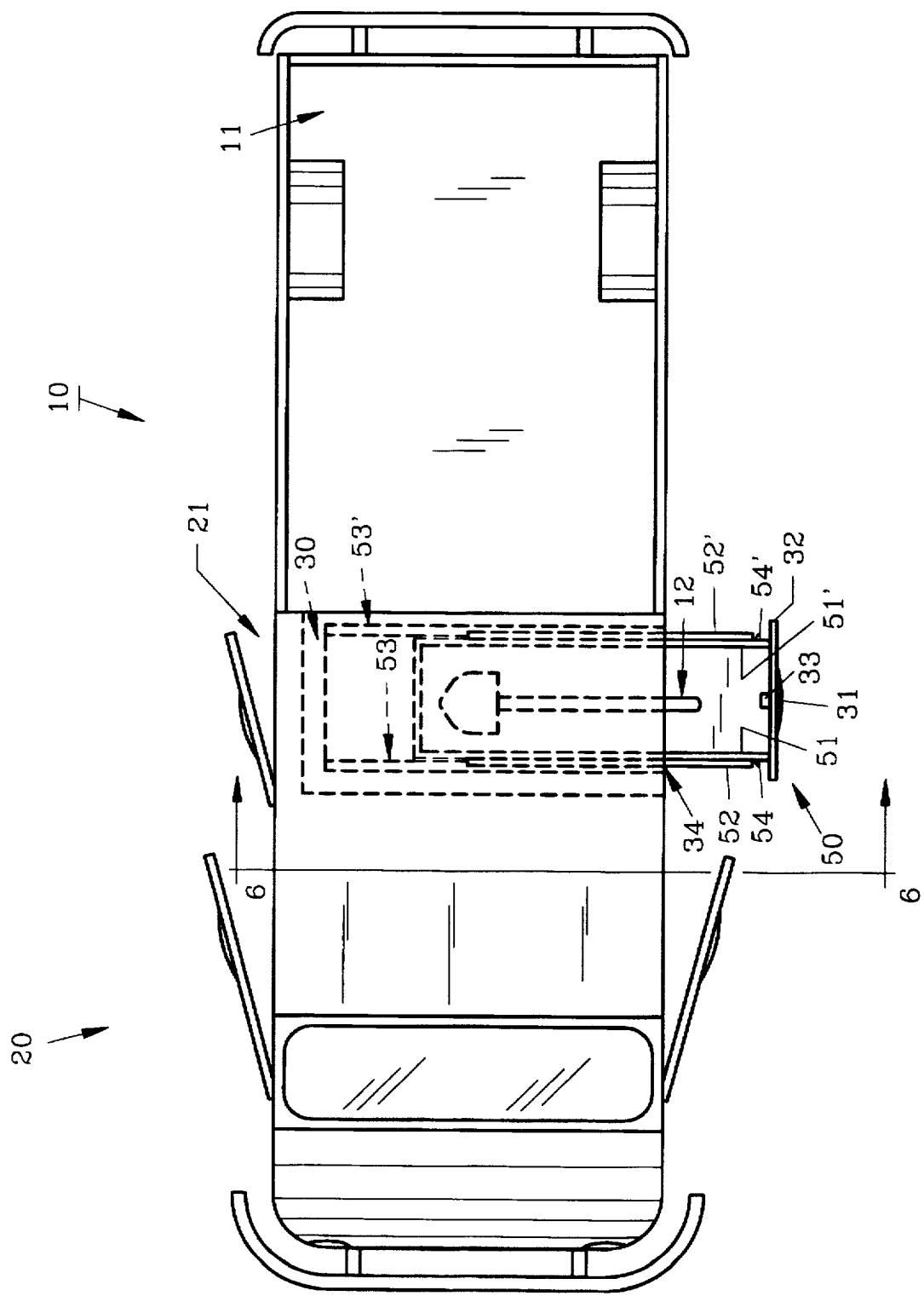
FIG. 3 pictures a top view of the motor vehicle with the passenger doors and the storage compartment door open and the storage compartment drawer slightly opened.

In FIG. 2 a close up view of extended cab portion 21 is seen and a hidden view of the preferred embodiment of storage compartment 30. Second seat 40 provides back cushion 41 and seat cushion 42. Storage compartment 30 is shown underneath seat cushion 42 and behind leg 43 and forward of back leg 44, all of which is rearward of operator seat 22. Storage compartment door 32 is joined to storage compartment drawer 50 as better seen in FIG. 3. Storage compartment drawer has a front wall formed from storage compartment door 32. Lateral sidewalls 51 and 51' extend along storage compartment 30 as seen in FIG. 3. Conventional vehicle door lock 33 operates latches 54 and 54' to lock storage compartment door 32 in a closed position. Drawer guides 53 and 53' are mounted on front leg 43 and rear leg 44 respectively. Drawer channels 52 and 52' are mounted on lateral sidewalls 51 and 51' respectively and receive drawer guides 53 and 53' respectively. In the preferred embodiment as seen in FIG. 2, drawer channels 52 and 52' are strong enough to support substantial weight from tools placed in storage compartment drawer 50 and preferably are made from steel or similar materials.

Figure 6:
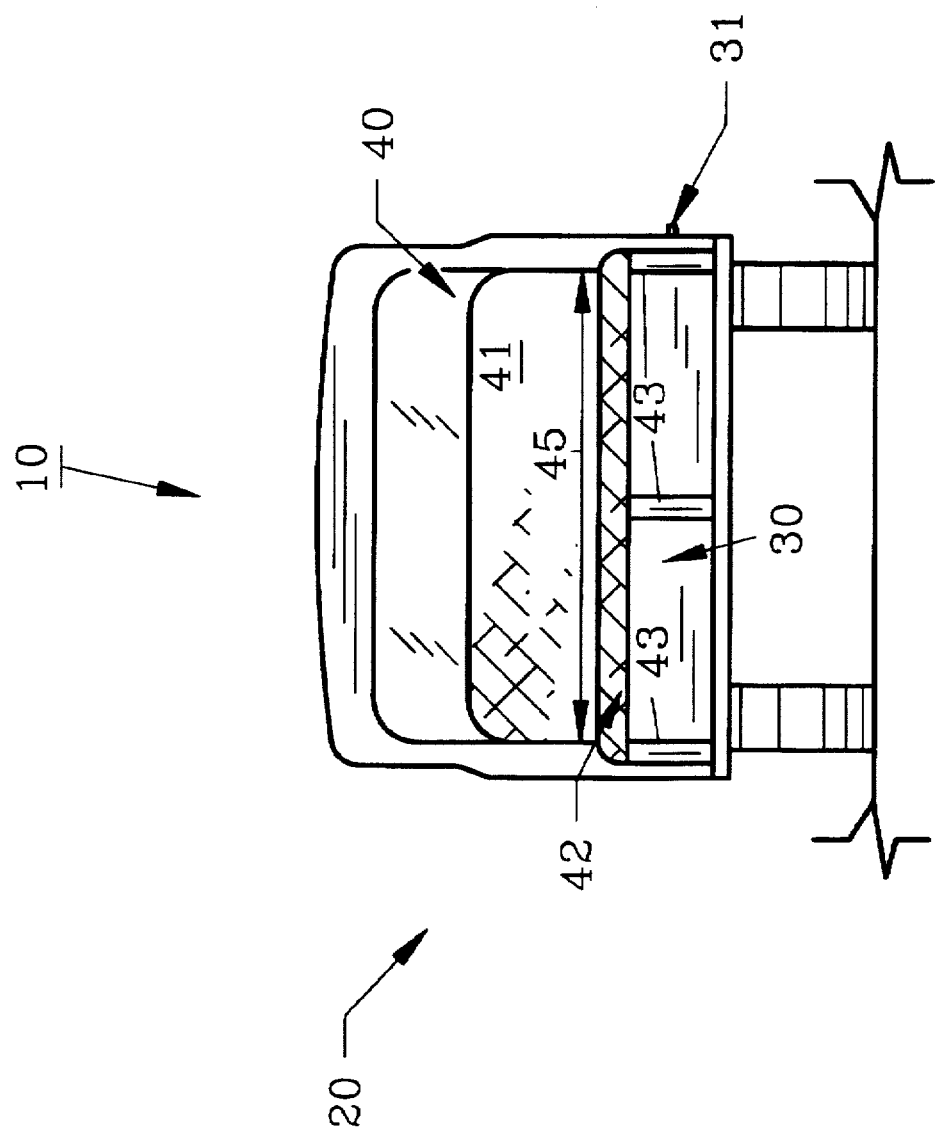
FIG. 6 illustrates a cut-away view of the passenger compartment along line 6—6 of FIG. 3 facing the rear of the vehicle.

Storage compartment drawer 50 is shown extended slightly from storage compartment 30 in FIG. 3. Both storage compartment 30 and drawer 50 extend substantially the length 45 (FIG. 6) of second seat 40 thereby allowing tool 12 such as a long shovel to be placed within drawer 50.

Figure 4:
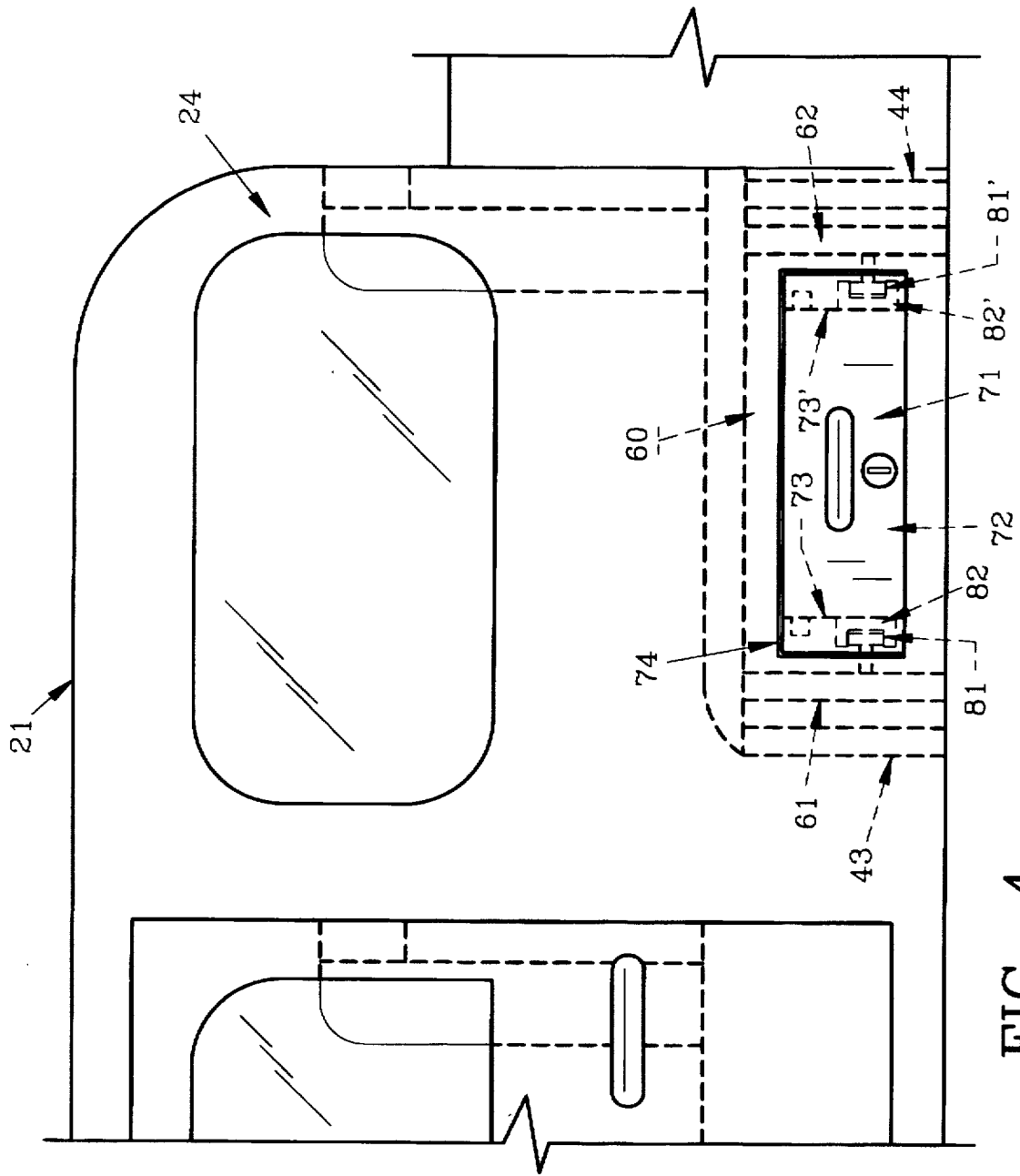
FIG. 4 shows an enlarged alternate embodiment of a partial side view in which the storage compartment is partitioned from the passenger compartment.

Also conceived within the scope of the present invention is storage compartment 60 as seen in FIG. 4, partitioned from passenger compartment 19 by containment walls 61 and 62. Exterior body wall 24 has opening 74. Storage compartment 60 has storage compartment door 71 which is slightly smaller than storage compartment door 32 because of the smaller dimensions of storage compartment 60, but is designed to be the same size and fit within opening 74. Storage compartment drawer 72 has sidewalls 73 and 73' which are spaced slightly less far apart than sidewalls 53 and 53' again due to the smaller dimension of compartment 60. Drawer guides 81 and 81' are now mounted on containment walls 61 and 62 respectively, while drawer channels 82 and 82' are mounted on drawer sidewalls 73 and 73' respectively, but fit together in the same manner as drawer guides 53, 53' and drawer channels 52, 52'.

It is also within the scope of the invention to switch the mounting of the drawer guides 53 and 53' to the lateral sidewalls 51 and 51' respectively and have the drawer channels 52 and 52' be mounted on either legs 43 and 44.

Figure 5:
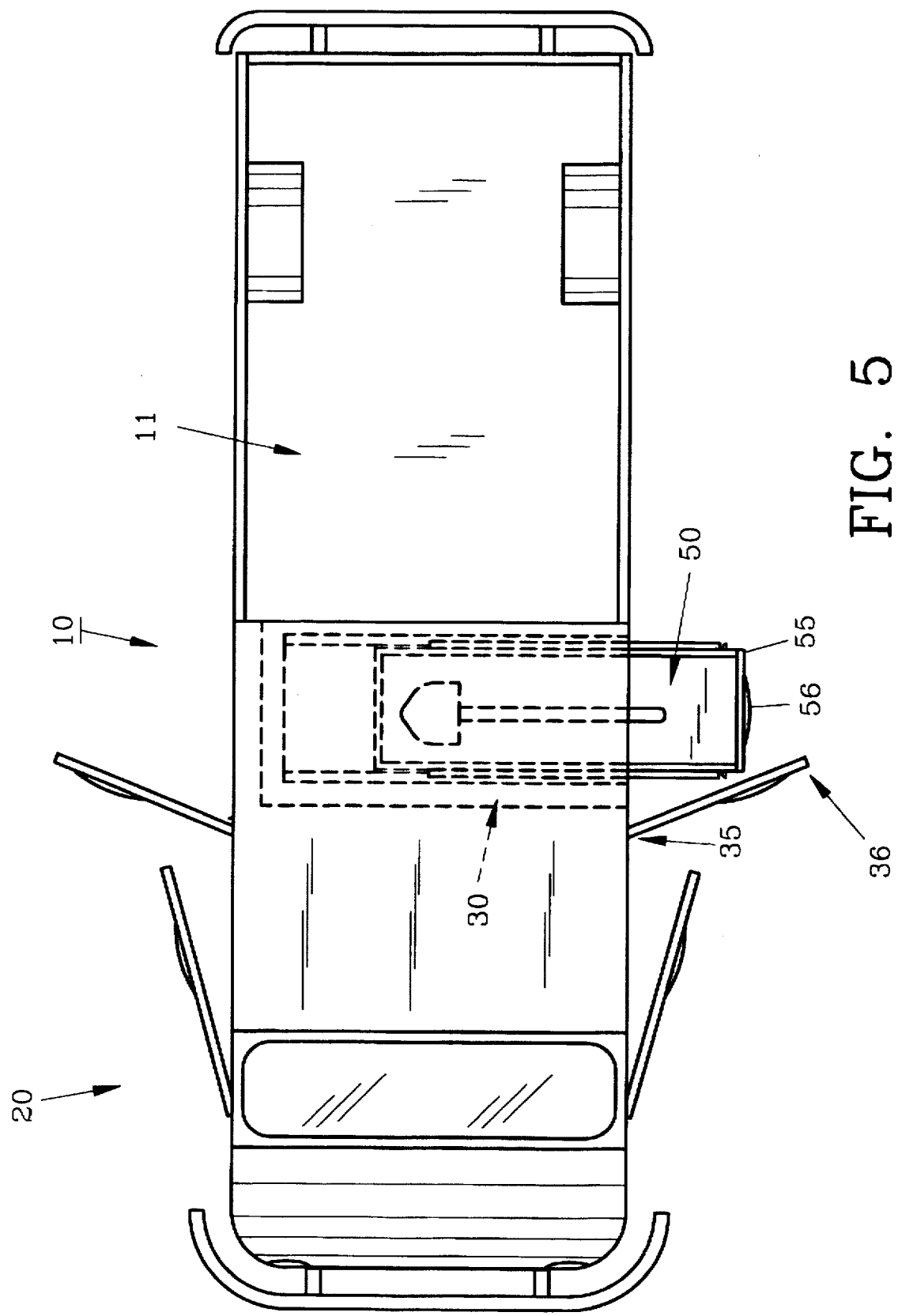
FIG. 5 demonstrates an alternative vehicle embodiment with a second rear door as seen from the same perspective as FIG. 3.

FIG. 5 shows an alternate embodiment wherein storage compartment door 36 is attached to hinge 35 on vehicle 10 and opens like a conventional vehicle door. Drawer 50 now has front wall 55 and handle 56 to facilitate pulling drawer 50 from storage compartment 30.

Although a pickup truck having front and back or second seats within the cab has been used to illustrate the invention, it is to be understood that the invention is not limited to the exact details of the construction, operation, materials, or embodiments shown and described, as modifications and equivalents are apparent to one skilled in the art without departing from the scope of the invention. Particularly, the present invention could be adapted to fit under a sleeping bed in a tractor trailer or similar space in another vehicle.

What is claimed is:

1. In a land vehicle having a passenger compartment with an exterior body wall, and containing an operator seat and a second seat, said second seat located behind said operator seat, wherein said second seat defines a storage compartment therebeneath, wherein the improvement comprises:

a storage compartment door, said storage compartment door located in the exterior body wall below said second seat and sized to approximate the height and width of said storage compartment, whereby said storage compartment can be accessed therethrough.

2. The land vehicle of claim 1, wherein said storage compartment has a depth substantially equal to the length of said second seat.

3. The land vehicle of claim 1, further comprising a lock, said lock mounted on said door.

4. The land vehicle of claim 1, further comprising a hinge, said hinge mounted on said door connecting said door to said exterior wall.

5. The land vehicle of claim 1, further comprising a drawer, said drawer slidably mounted in said storage compartment.

6. The land vehicle of claim 1, further comprising a partitioning member, said partitioning member mounted under said second seat and separating said storage compartment from said passenger compartment.

7. The land vehicle of claim 6, further comprising a drawer, said drawer slidably mounted in said storage compartment.

8. The land vehicle of claim 7, further comprising means for guiding said drawer, said drawer guiding means mounted on said partitioning member.

9. A storage device comprising:

a storage compartment, a drawer, said drawer slidably positioned in said storage compartment, a vehicle seat, said storage compartment beneath said vehicle seat, an exterior vehicle body wall, said exterior body wall defining an opening, said opening coincidental to said storage compartment, a door, said door positioned within said opening whereby said drawer can be slid from beneath said vehicle seat through said opening.

10. The storage device of claim 9 wherein said door is pivotally affixed to said exterior body wall.

11. The storage device of claim 9 wherein said door forms a front sidewall of said drawer.

12. The storage device of claim 9, further comprising a lock, said lock mounted on said door.

13. The storage device of claim 9, further comprising a handle, said handle mounted on said door.

14. The storage device of claim 9, wherein said storage compartment has a depth substantially equal to the length of said vehicle seat.

15. A method of storing items in a storage compartment of a land vehicle having a passenger compartment, said passenger compartment having an exterior body wall and containing an operator seat and a second seat behind the operator seat, the method comprising:

a) providing a storage compartment disposed beneath said second seat;

b) providing a storage compartment door located in the exterior body wall below said second seat and sized to approximate the height and width of said storage compartment;

c) opening said storage compartment door; and d) placing an item in said storage compartment.

16. The method of claim 15 further comprising the step of providing a slidable drawer in said storage compartment.

17. The method of claim 16 further comprising the steps of sliding the drawer from the storage compartment and thereafter placing an item in said drawer.

* * * * *